United States Patent
Lee et al.

(10) Patent No.: US 9,058,087 B2
(45) Date of Patent: Jun. 16, 2015

(54) SMART DEVICE AND METHOD FOR CONTROLLING THE SAME

(71) Applicant: LG ELECTRONICS INC., Seoul (KR)

(72) Inventors: Kunwoo Lee, Seoul (KR); Juhwan Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 303 days.

(21) Appl. No.: 13/778,542

(22) Filed: Feb. 27, 2013

(65) Prior Publication Data

US 2014/0189562 A1     Jul. 3, 2014

(30) Foreign Application Priority Data

Dec. 31, 2012   (KR) .................. 10-2012-0158320

(51) Int. Cl.
  *G06F 3/033*      (2013.01)
  *G06F 3/048*      (2013.01)
(52) U.S. Cl.
  CPC ...................................... *G06F 3/048* (2013.01)
(58) Field of Classification Search
  USPC ................................. 715/863, 716, 864, 835
  See application file for complete search history.

(56) References Cited

U.S. PATENT DOCUMENTS

| | | | |
|---|---|---|---|
| 6,111,576 A * | 8/2000 | Moreland et al. | 715/841 |
| 6,246,411 B1 * | 6/2001 | Strauss | 715/863 |
| 6,388,686 B1 * | 5/2002 | Hetherington et al. | 715/810 |
| 7,471,328 B2 * | 12/2008 | Kim et al. | 348/333.12 |
| 7,705,833 B2 | 4/2010 | Kim | |
| 8,056,016 B2 | 11/2011 | Kim et al. | |
| 2002/0033849 A1 * | 3/2002 | Loppini et al. | 345/848 |
| 2007/0277123 A1 * | 11/2007 | Shin et al. | 715/863 |
| 2010/0194705 A1 | 8/2010 | Kim et al. | |
| 2011/0032191 A1 | 2/2011 | Cooke et al. | |
| 2012/0050012 A1 | 3/2012 | Alsina et al. | |
| 2012/0194428 A1 * | 8/2012 | Kwon et al. | 345/157 |
| 2013/0162611 A1 * | 6/2013 | Lim et al. | 345/207 |

FOREIGN PATENT DOCUMENTS

| WO | WO 2009/134423 A1 | 11/2009 |
|---|---|---|
| WO | WO 2012/094145 A1 | 7/2012 |

* cited by examiner

*Primary Examiner* — Omar Abdul-Ali
(74) *Attorney, Agent, or Firm* — Birch, Stewart, Kolasch & Birch, LLP

(57) ABSTRACT

A smart device and a method for controlling the same are disclosed herein. Herein, the method includes the steps of operating an application of the smart device, so as to display contents and a contents control interface controlling the contents, wherein the contents control interface may control a display of the contents in accordance with a first input with respect to the content control interface, and wherein a display direction of the contents may be displayed by being automatically or manually rotated, and controlling the display direction of the contents by using a second input with respect to the contents control interface, wherein the playback function of the contents is controlled in accordance with the first input, and wherein a position of the contents control interface may be relocated in accordance with the second input.

12 Claims, 10 Drawing Sheets

(a)　　　　　　　　　　　(b)

SMART DEVICE AND METHOD FOR CONTROLLING THE SAME

This application claims the benefit of the Korean Patent Application No. 10-2012-0158320, filed on Dec. 31, 2012, which is hereby incorporated by reference as if fully set forth herein.

BACKGROUND OF THE INVENTION

1. Field of the Invention

The present disclosure relates to a smart device and a method for controlling the same.

2. Discussion of the Related Art

A smart device is equipped with a variety of functions in order to facilitate the usage of the smart device for its user. The smart device may perform such variety of functions by downloading diverse applications and by using the downloaded applications.

For example, when the smart device is provided with an automatic screen rotation function, even if the direction of the smart device is turned upside down, contents displayed on the smart device may be rotated in the opposite direction, so that the display of the contents can be maintained in a right side up direction. The smart device may use a sensor, such as a gravity sensor, which is provided within the smart device, so as to detect (or sense) the up and down (or vertical) direction of the smart device. Accordingly, when the user tilts the smart device so that its display screen can be displayed horizontally, or when the user tilts the smart device so that its display screen can be displayed vertically, the sensor of the smart device may sense the vertical direction of the smart device, thereby displaying the contents in accordance with the rotated direction of the display screen.

However, the control function of automatically rotating the direction of the contents, which are displayed on the display screen, may occasionally cause inconvenience to the user. For example, when the user views his (or her) smart device while lying down, or when the user seeks to view the contents while fixing the direction of the display screen, if the smart device automatically rotates the direction of the display screen, the actual direction of the display screen may be different from the direction of the user's viewing direction, or the actual direction of the display screen may be different from the user's viewing purpose, thereby causing the user to experience inconvenience.

In the related art, the display screen rotating function of the smart device can be controlled by finding a Display Set-up function. However, if the user wishes to turn off the display screen rotating function while viewing the contents, the user is required to undergo the inconvenience of being interrupted from viewing the contents and having to search for the Display Set-up function.

Similarly, an Automatic Screen Deactivate (or Sleep) function, which generally turns off the display screen automatically in order to reduce excessive power consumption when the smart device detects no user input for a predetermined period of time, may cause inconvenience to the user. More specifically, when the user seeks to view contents through the display screen of his (or her) smart device for a long period of time, the user is required to control a Screen Deactivate (or Sleep) or Activate (or Wake) function while viewing the contents. In this case, also, the user is required to undergo the inconvenience of being interrupted from viewing the contents and having to search for the corresponding set-up function.

SUMMARY OF THE INVENTION

Accordingly, the present disclosure is directed to a smart device and a method for controlling the same that substantially obviate one or more problems due to limitations and disadvantages of the related art.

An object of the present disclosure is to provide a smart device and a method for controlling the same that can easily control the display screen of the smart device.

Another object of the present disclosure is to provide a smart device and a method for controlling the same that can control the display screen without interrupting the user, when the user is viewing contents on the smart device.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method for controlling a smart device includes the steps of displaying contents on a display of the smart device, displaying a contents control interface controlling the contents, controlling a playback function of the contents in accordance with a first input inputted with respect to the contents control interface, and displaying the contents by automatically or manually rotating a display direction of the displayed contents. Herein, the display direction of the contents may be changed in accordance with a second input, wherein the second input relocates a position of the contents control interface from a first side to a second side of the display.

The method may further include having the contents control interface disappear from a display screen after a predetermined period of time.

The method may further include detecting a rotating movement of the smart device, and, when the smart device is operated in a manual mode, displaying the contents control interface on the display.

A display direction of the contents may be automatically rotated in accordance with a response of a direction of the smart device with respect to gravity.

The contents may be rotated after the relocation of the contents control interface is completed. And, when the contents control interface touches a docking part being displayed on a screen of the smart device and is docked to the docking part, a display direction of the contents may be fixed.

The docking part may be located on a lowermost portion of the screen, and the contents control interface may come in touch with the docking part in accordance with a third input, so as to fix the display direction of the contents, wherein the third input relocates the contents control interface.

The flicking function of the contents may be fixed in accordance with the second input. And, the position of the contents control interface and the display direction of the contents may be relatively fixed in accordance with the second input.

In another aspect of an embodiment, a method of controlling a smart device includes the steps of displaying contents on a display of the smart device, displaying a contents control interface controlling the contents, controlling a function of the contents in accordance with a first input inputted with respect to the contents control interface, and displaying the contents by controlling a display brightness level of the contents. Herein, the display brightness level of the contents may be changed in accordance with a second input, wherein the second input relocates a position of the contents control interface within the display.

The method may further include controlling the display brightness level by moving the position of the contents control interface from one side of the display.

In a further aspect of an embodiment, a smart device includes a display unit configured to display contents and to display a contents control interface controlling the contents, a sensor unit configured to detect a first input respective to the contents control interface and a second input relocating a position of the contents control interface from a first side to a second side of the display, and a control unit configured to control a function of the contents in accordance with the first input and changing a display direction of the contents in accordance with the second input.

It is to be understood that both the foregoing general description and the following detailed description of the present disclosure are exemplary and explanatory and are intended to provide further explanation of the embodiments as claimed.

BRIEF DESCRIPTION OF THE DRAWINGS

The accompanying drawings, which are included to provide a further understanding of the disclosure and are incorporated in and constitute a part of this application, illustrate embodiment(s) and together with the description serve to explain the principle of the embodiments. In the drawings.

DETAILED DESCRIPTION OF THE INVENTION

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
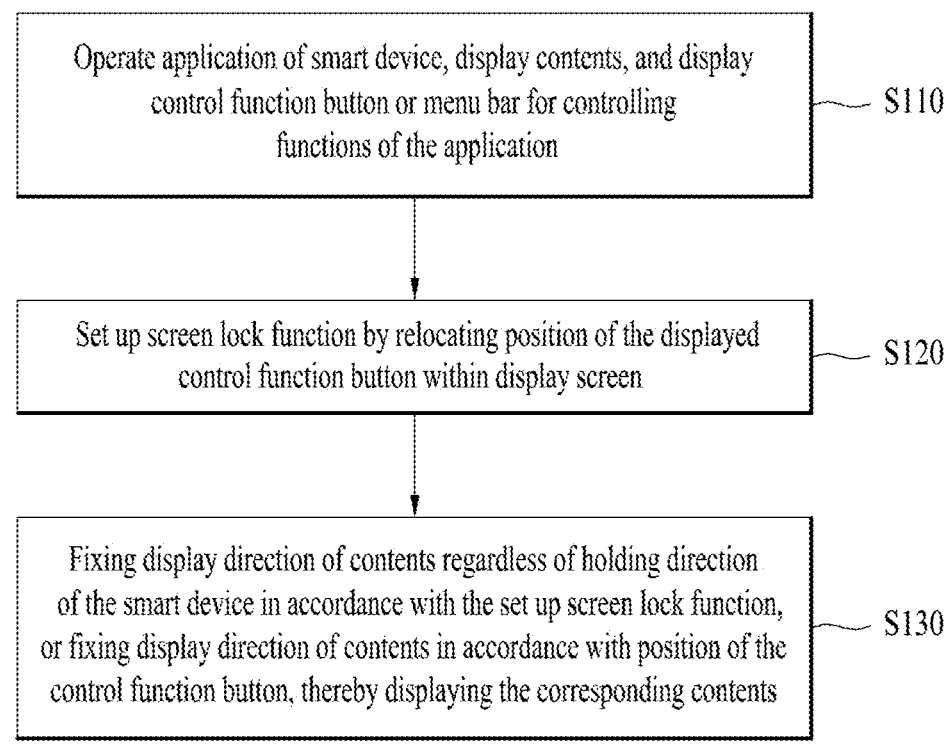
FIG. 1 illustrates an exemplary method for controlling a smart device according to a disclosed embodiment.

FIG. 1 illustrates an exemplary method for controlling a smart device according to a disclosed embodiment.

The smart device operates (or executes) an application, displays contents through the operated (or executed) application, and displays a control function button or a menu bar for controlling diverse functions of the operated (or executed) application (S110). The control function button or menu bar will hereinafter be referred to as a contents control interface. The contents control interface may control the corresponding contents in accordance with a first input of the user. Herein, the display direction of the contents may be automatically rotated based upon a response of a held direction of the smart device to gravity.

For example, when the smart device operates an application that displays digital mobile broadcasting, the contents control interface may correspond to a control function button controlling a corresponding digital mobile broadcast program. In this case, the smart device may display a contents control interface, which includes a Record function button, a Select Channel button, a Control Volume button, and so on, on a display screen of the smart device. The display of the corresponding content may be controlled in accordance with a first input inputted with respect to any one of the buttons mentioned above.

The Record function button performs a function of recording the contents of mobile broadcasting, and the Select Channel button performs a function of changing mobile broadcasting channels. Additionally, the Control Volume button may control output volume levels of the contents of mobile broadcasting.

In another example, when the smart device operates a web browser, a contents control interface controlling the web browser may be displayed on the display screen displaying the corresponding web browser. The contents control interface may include Web browser options, such as Page Up/Down, Refresh, Display New Tab, Move to Website, Search Page, Display PC version, and so on, and buttons having other functions may also be displayed on the display screen.

Thereafter, as described above, the smart device may set up a Lock Screen option by changing the position of the contents control interface being is displayed on the display screen with respect to each application (S120).

As a second input inputted by the user with respect to the contents control interface, the position of the contents control interface may be relocated from a first side of the display screen to a second side.

In the above-described example according to the disclosed embodiment, if the application corresponds to an application displaying digital mobile broadcasting, the displayed position of the contents control interface, which displays function buttons, such as a Record function button, a Select Channel button, a Control Volume button, and so on, on the display screen may be relocated (or changed). Accordingly, the user may touch the corresponding contents control interface, so as to relocate the position of the touched contents control interface to another location. Herein, the contents may be rotated after the relocation of the contents control interface is completed.

Accordingly, the display direction of the digital mobile broadcasting contents, which is displayed by an application displaying digital mobile broadcasting, may be fixed with respect to the relocation of the contents control interface on the display screen. A detailed example of the same will be described with reference to FIG. 3.

In yet another example, if the application corresponds to a web browser, the user may relocate the position of the contents control interface being displayed on the display screen, wherein the contents control interface includes options, such as Page Up/Down, Refresh, Display New Tab, Move to Website, Search Page, Display PC version, and so on, which are displayed within a web browser. Accordingly, the displayed location of the contents control interface, such as a function button, a function button set, or a menu bar, may be relocated in the display screen, and a screen lock function (or Lock Screen function) may be set up, respectively. A detailed example of the same will be described with reference to FIG. 7.

Thereafter, the display direction of the contents may be fixed and displayed in accordance with the determined screen lock function, regardless of the holding direction of the smart device, or the display direction of the contents may be fixed and displayed in accordance with the position of the control function button(s) or menu bar (S130). An example of a screen control function, such as the screen lock function, being set up in accordance with the position of the menu bar, and having the display direction changed in accordance with the set up position of the menu bar, will be described in detail with reference to FIG. 2 to FIG. 9.

The contents control interface may disappear from the display screen after a predetermined period of time. And, afterwards, if the interface is in manual mode, wherein the user is required to manually control the display of the contents, the user may manually display the contents control interface on the display screen.

Figure 2:
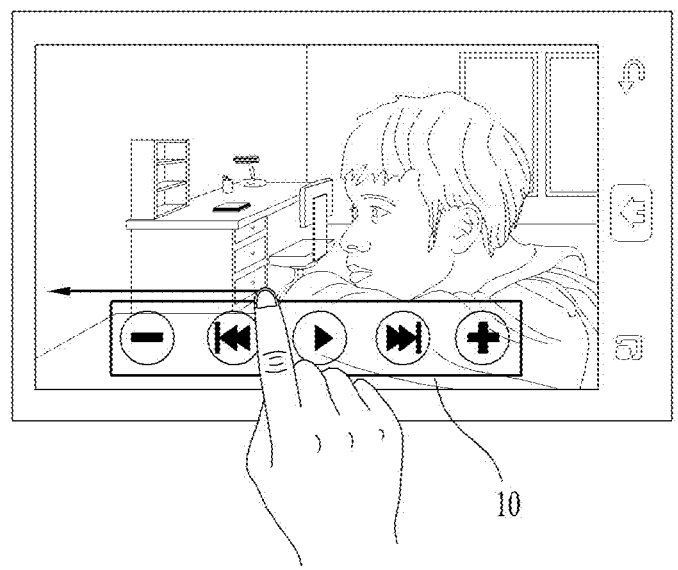
FIG. 2 illustrates an exemplary method for controlling a smart device according to an exemplary embodiment.

FIG. 2 illustrates an exemplary method for controlling a smart device according to an exemplary embodiment.

As an application operating in the smart device, FIG. 2 shows an example of an application displaying digital broadcasting or displaying a video file.

When the smart device operates an application, which displays digital broadcasting or a video file, a contents control interface 10 that can control the digital broadcasting or video file is displayed on a portion of the display screen. For example, the user may use the contents control interface 10 in order to control the channel, whether or not to perform recording, the volume, and so on, of the digital broadcasting.

Alternatively, in case the application plays-back (or reproduces) video files, a contents control interface 10, which can control the contents by controlling play, stop, fast forward, backward (or rewind) options of the contents, may be displayed on the display screen.

According to the disclosed embodiment, the display position of the contents control interface 10, which controls the contents being displayed through the respective application, within the display screen may be relocated and fixed to a new position along a direction indicated by the arrow shown in FIG. 2. As illustrated in the example shown in FIG. 2, when the user touches a button or menu controlling the contents, within the display screen of the smart device according to an embodiment, and when the user slides his (or her) finger to relocate the contents control interface to a new position along the direction indicated by the arrow, the user may set up screen lock.

Figure 3:
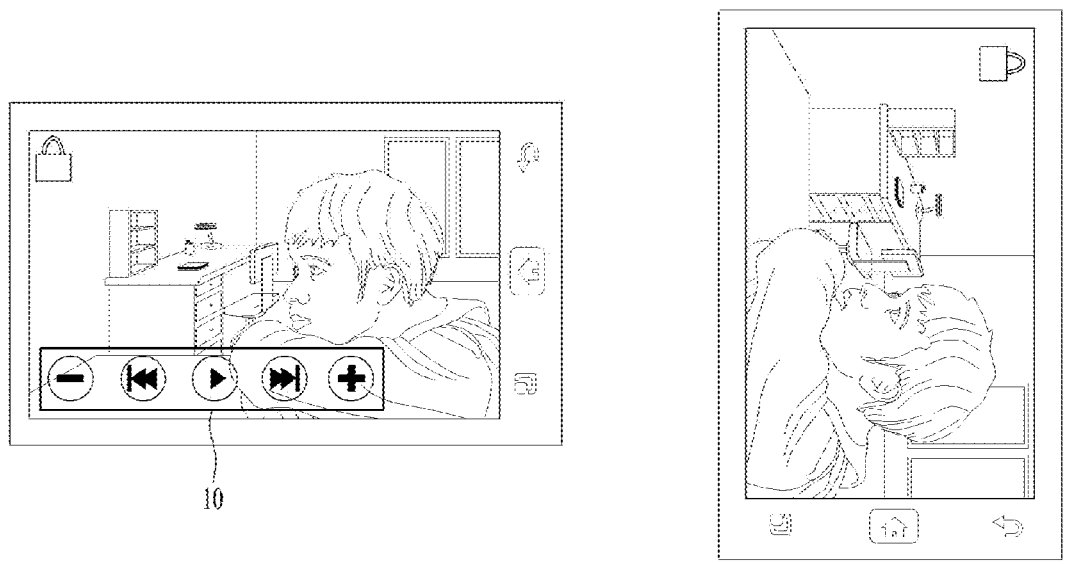
FIG. 3 illustrates examples of having the display screen fixed according to an exemplary method for controlling the smart device shown in FIG. 2.

FIG. 3 illustrates examples of having the display screen fixed according to an exemplary method for controlling the smart device shown in FIG. 2. When the position of the contents control button or menu is changed (or relocated) within the display screen of the smart device, screen lock may be set up. When the screen lock function is set up, an identifier (shown as a locked padlock in the example of FIG. 3) indicating that the screen lock function is set up (or activated) may either be displayed on the display screen for only a predetermined period of time or may be continuously displayed on the display screen. Additionally, the display position of the contents control interface 10 of the corresponding contents may also be displayed for only a predetermined period of time or may be continuously displayed on the display screen.

Therefore, according to the disclosed embodiment, even if the smart device is being rotated, the display direction of the contents may remain locked without rotating with respect to the holding position (or angle) of the smart device. Thus, it will be advantageous in that the user is no longer required to be interrupted from using (or viewing) particular contents in order to search for and find the screen control function, so as to set up the screen lock function, and, instead, the user may be capable of easily setting up the display direction of the display screen.

Figure 4:
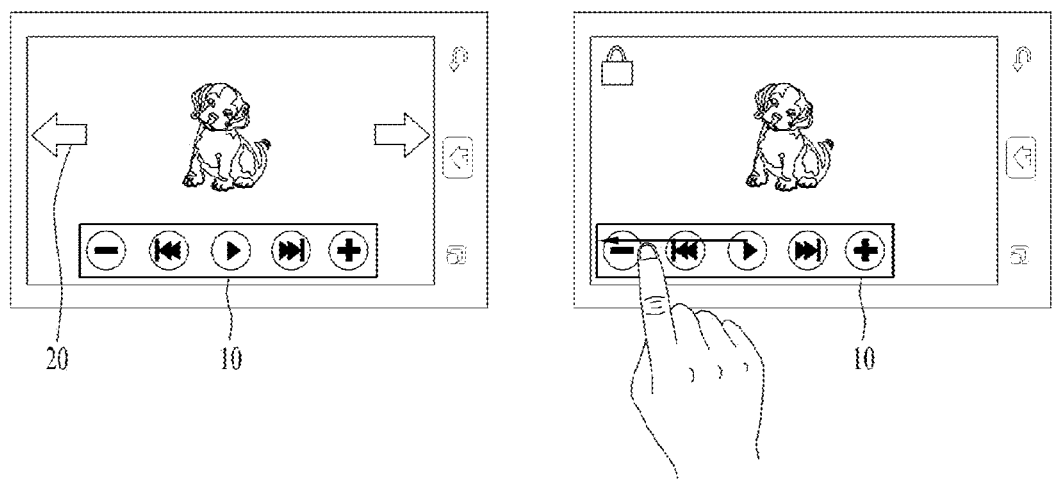
FIG. 4 illustrates examples of a method for fixing a display screen according to an exemplary embodiment.

FIG. 4 illustrates examples of a method for fixing a display screen according to an exemplary embodiment. An application may correspond to diverse types of applications including moving picture playback applications, movie player applications, photo album applications, and so on. Such applications may select a content that is being (or that is to be) displayed on the display screen in accordance with a flicking function.

The disclosed embodiment shows an example of locking the flicking function or setting up the screen lock function by relocating (or changing) the position of the button or menu controlling an application.

In the example shown in FIG. 4, a button or menu is displayed on a lower portion of the display screen as the contents control interface 10 controlling the corresponding application or controlling the corresponding contents through the respective application. Additionally, the arrow 20 displayed on the display screen of the left-side drawing shows an example of an identifier 20 indicating the flickering function as a contents control interface.

As shown on the right-side drawing of FIG. 4, when the user changes (or relocates) the position of the contents control interface 10 controlling the application, which is displayed on the display screen, along the direction indicated by the arrow by using a touch function, the user may input settings for locking the flickering function or for locking the screen rotation function.

Figure 5:
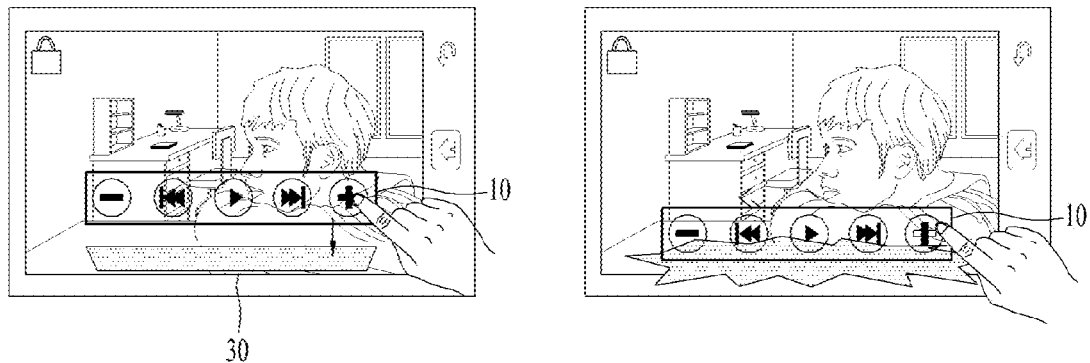
FIG. 5 illustrates another example of a method for fixing a display screen according to the exemplary embodiment.

FIG. 5 illustrates another example of a method for fixing a display screen according to the exemplary embodiment.

In example (a) of FIG. 5, in order to control the screen rotation function by using the contents control interface 10, a docking part 30 may be displayed on a portion of the display screen.

As shown in the example (b) of FIG. 5, when the user moves the contents control interface 10, so as to contact the moved contents control interface 10 with the docking part, the contents control interface 10 may be fixed to the docking part, and the screen lock function may be set up at the same time. More specifically, when the contents control interface 10 touches the docking part, which is displayed on the display screen of the smart device according to an embodiment, and when the contents control interface 10 is docked in the docking part, the display direction of the corresponding contents may be fixed (or locked).

As shown in FIG. 5, the docking part may be located on the lowermost portion of the display screen, and the contents control interface may be moved (or relocated) in accordance with a third input, which relocates (or moves) the position of the contents control interface, so as to come in contact with (or touch) the docking part. Thus, the display direction of the corresponding contents may be fixed (or locked).

Figure 6:
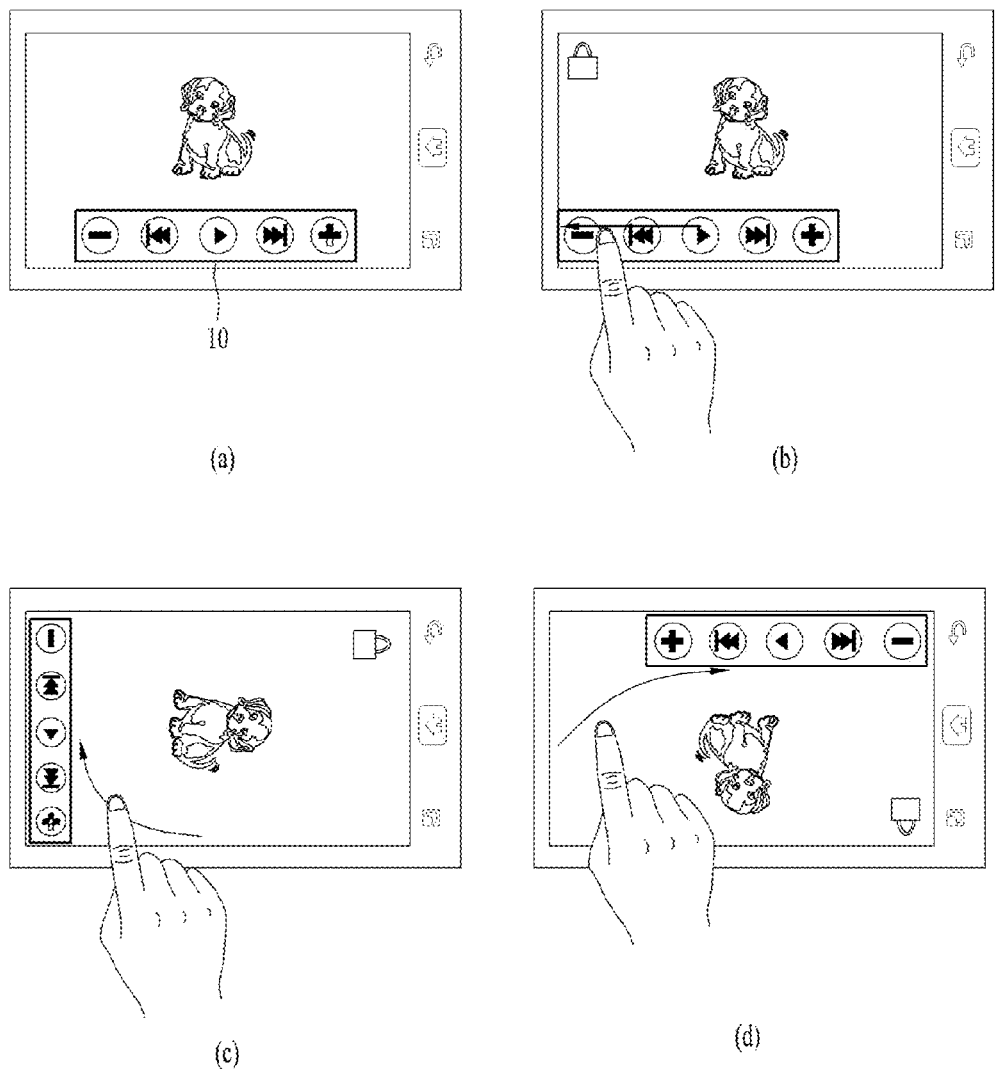
FIG. 6 illustrates yet another example of a method for fixing a display screen according to the exemplary embodiment.

FIG. 6 illustrates yet another example of a method for fixing a display screen according to the exemplary embodiment.

According to the disclosed embodiment, the display direction of the contents may be fixed in accordance with the position of a button or menu of the contents control interface 10, which controls the respective application. More specifically, the position of the contents control interface 10 and the display position of the contents may be relatively fixed and displayed accordingly. Conversely, when the position of an application menu or button for fixing the display direction of the display screen is changed (or relocated), the display direction of the contents may also be changed respectively, and the display direction of the corresponding contents may be fixed to the newly changed direction. Thus, the corresponding contents may be displayed accordingly.

For example, the contents control interface 10 of the application is located at a specific position within the display screen. For simplicity of the description, as shown in example (a) of FIG. 6, it will be assumed that the contents control interface 10 of the application is located at the lower portion of the content or at the lower portion of the display screen.

In this case, when the user relocates (or changes) the position of the contents control interface 10 of the application along a specific direction, e.g., from right to left, as shown in example (b) of FIG. 6, by using the above-described method, the screen lock function may be set up.

However, in case the screen lock function is set up, the direction according to which the content is being displayed may vary with respect to the relocated position of the contents control interface 10 controlling the corresponding application.

For example, as shown in (c) of FIG. 6, when the contents control interface 10 is relocated to the left side portion of the display screen along the direction shown in (c) of FIG. 6, the display direction of the content may be changed so that the contents control interface 10 of the corresponding application is located on the lower portion of the displayed content, and the screen lock function may be set up.

Similarly, as shown in (d) of FIG. 6, when the contents control interface 10 is relocated to the upper side portion of the display screen along the direction shown in (d) of FIG. 6, the display direction of the content may be changed so that the contents control interface 10 of the corresponding application is located on the lower portion of the displayed content, and the screen lock function may be set up.

As described above, regardless of the holding direction of the smart device, the screen lock function may be set up so that the display direction of the displayed content can vary in accordance with the position of the contents control interface 10 of the corresponding application.

Figure 7:
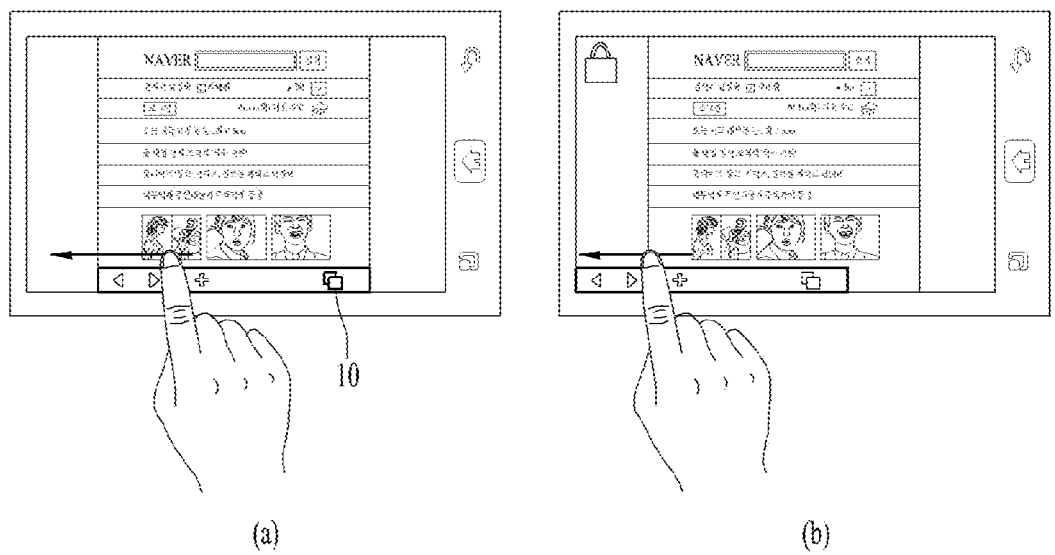
FIG. 7 illustrates another exemplary method for controlling a smart device according to an exemplary embodiment.

FIG. 7 illustrates another exemplary method for controlling a smart device according to an exemplary embodiment. FIG. 7 shows an example when the application corresponds to a web browser. For example, the contents control interface 10 of a web navigation, which controls a web page with respect to the corresponding web browser, may be displayed on the display screen of the smart device according to an embodiment.

(a) of FIG. 7 discloses an example of the contents control interface 10 of the web navigation being located on a lower portion of the smart device.

For example, as shown in (b) of FIG. 7, when the user relocates (or changes) the position of the contents control interface 10 of the web navigation by sliding the contents control interface 10, the display direction of the web page may be fixed, and the screen lock function may be displayed on the display screen. Therefore, in this case, even if the smart device is rotated, so as to be held along a vertical direction, the display direction of the displayed content may be decided in accordance with the holding direction of the smart device, or in accordance with the location of the contents control interface 10 of the web navigation. And, the display screen may be fixed (or lock) so as to be displayed along the fixed direction.

Figure 8:
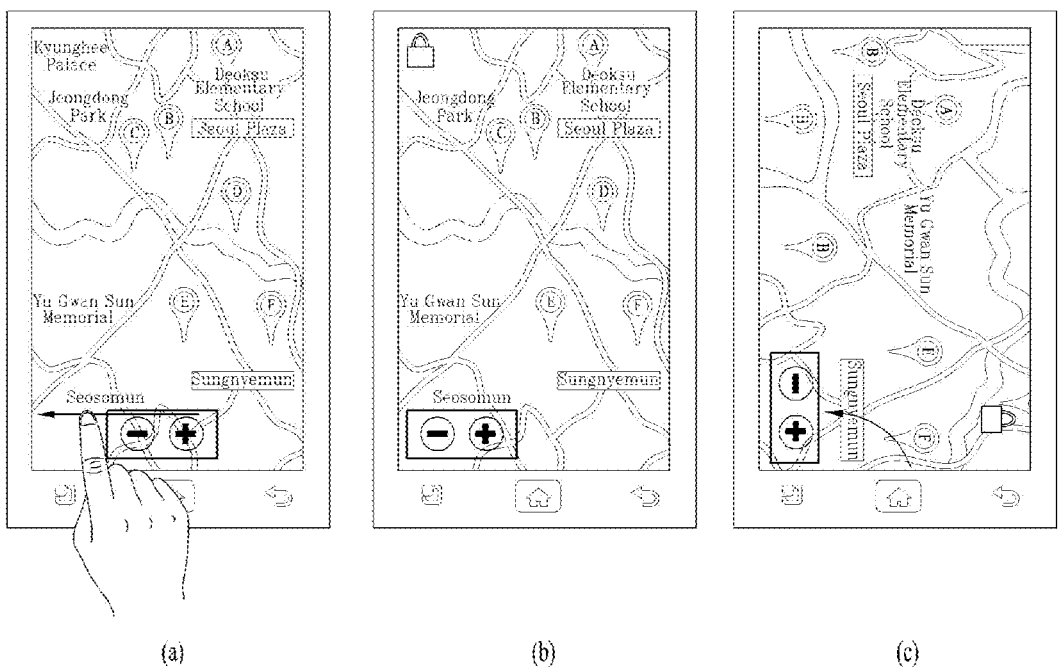
FIG. 8 illustrates yet another exemplary method for controlling a smart device according to an exemplary embodiment.

FIG. 8 illustrates yet another exemplary method for controlling a smart device according to an exemplary embodiment. FIG. 8 shows an example when the application corresponds to a map application.

For example, as shown in (a) of FIG. 8, a control button 10 controlling the displayed map content, such as a button for setting up map resolution, a button for setting up main position of the map, and so on, may be displayed on a portion of the display screen.

As shown in (b) or (c) of FIG. 8, when the user slides the contents control interface 10 of the map application, so as to fix the contents control interface 10 to a specific position, the display direction of the display screen may be set up (or determined) in accordance with the location of the contents control interface 10 of the corresponding application (or map application). Thus, the screen lock function may be set up.

Accordingly, even if the smart device is rotated, due to the screen lock function, the display direction of the display screen remains fixed regardless of the holding direction (or angle) of the smart device according to an embodiment.

Figure 9:
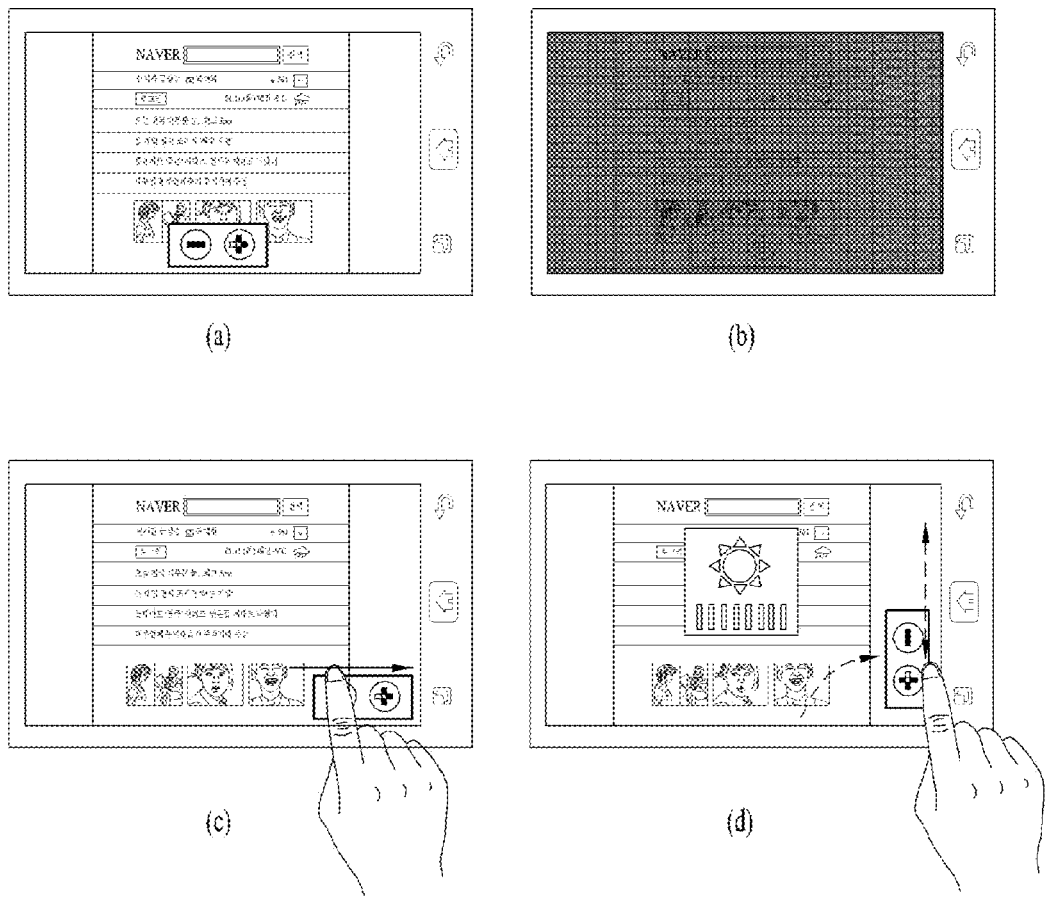
FIG. 9 illustrates yet another exemplary method for controlling a smart device according to an exemplary embodiment.

FIG. 9 illustrates yet another exemplary method for controlling a smart device according to an exemplary embodiment. FIG. 9 shows an example of controlling display screen setting by using a contents control interface 10 controlling the corresponding application.

For example, as shown in (a) of FIG. 9, it will be assumed that the user executes (or operates) an application, such as a web browser, on the smart device. In the disclosed example, it will be assumed that the contents control interface 10 of the application, which corresponds to a web browser, is displayed on a lower portion of the display screen of the smart device according to an embodiment.

Generally, as shown in (b) of FIG. 9, in order to maintain battery duration for a longer period of time, the smart device is equipped with a screen off function, which dims the brightness of the display screen when a specific signal is not inputted to the smart device for a predetermined period of time, and which eventually turns off the display screen.

As shown in (c) of FIG. 9, when the user relocates the position of the contents control interface 10 within the display screen of the smart device by sliding the contents control interface 10 to a new position on the display screen, the screen lock function may be set up as described above.

Additionally, as shown in (d) of FIG. 9, when the user relocates the menu bar 10 of the corresponding application once again, the user may use the relocated contents control interface 10 to control the brightness of the display screen. For example, when the contents control interface 10 is relocated along the direction of one side of the display screen, to which the contents control interface 10 is relocated, the brightness of the display screen may be controlled in accordance with the position of the relocated contents control interface 10.

Unlike the above-described example, (c) of FIG. 9 may show a fixed display screen brightness mode, instead of the screen lock function, in accordance with the position of the contents control interface 10. And, (d) of FIG. 9 may show a mode for controlling the brightness of the display screen.

Accordingly, when a specific application is being executed, the screen lock function may be set up by relocating the position of the contents control interface 10 of the corresponding application, while viewing the content displayed through the executed application, and the brightness of the display screen may also be controlled. Therefore, the display screen may be easily fixed or the brightness of the display screen may be controlled in accordance with the user environment, without interrupting the usage of the application content.

Figure 10:
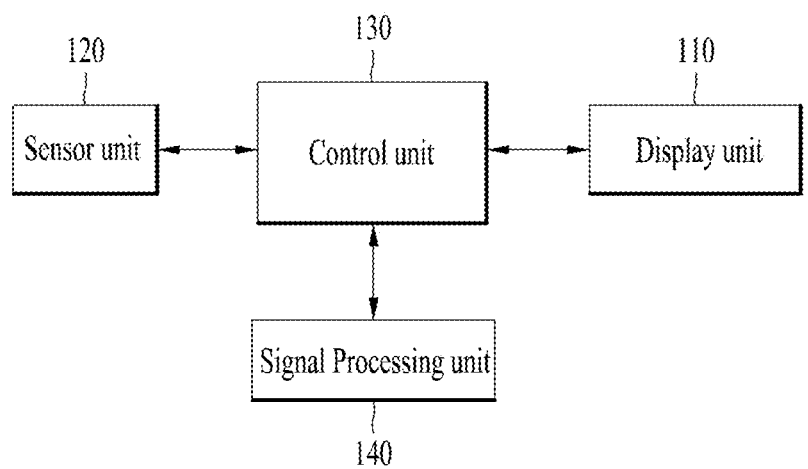
FIG. 10 illustrates an example of the smart device according to an exemplary embodiment.

FIG. 10 illustrates an example of the smart device according to an exemplary embodiment. An example of the smart device according to an embodiment will hereinafter be described in detail with reference to FIG. 10.

The exemplary smart device according to an embodiment may include a display unit 110, a sensor unit 120, and a control unit 130. In case the smart device is equipped with mobile phone functions or mobile broadcast display functions, the smart device according to an embodiment may further include a signal processing unit 140.

The display unit 110 may display diverse types of contents in accordance with respective applications being operated (or executed) by the smart device.

The sensor unit 120 may sense (or detect) movements of the smart device, thereby detecting vertical or horizontal holding direction (or angle) of the smart device. For example, the sensor unit 120 may detect the movements of the smart device, including movements along a vertical (or up-and-down) direction, in accordance with movement sensing functions of a gravity detection sensor, an optical sensor, a hall sensor, a geomagnetic sensor, and so on. When the sensor unit 120 includes a touch sensor, and when the user performs a touch motion on the display unit 110, the sensor unit 120 may detect the touch motion applied on the display unit 110.

The control unit 130 may control diverse functions of the smart device. For example, the control unit 130 may operate diverse applications. More specifically, for example, the control unit 130 may operate diverse applications for displaying digital mobile broadcasting, playing-back moving pictures, verifying short messages, and so on.

The signal processing unit 140 may process a communication signal and transmit and/or receive (or transceive) the processed communication signal. Alternatively, the signal processing unit 140 may also process a received broadcast signal.

When the control unit 130 operates an application, the display unit 110 may display the operated application. Herein, when the corresponding application is operated, a contents control interface 10 including a menu bar or button, which can control the operated application, may be displayed on the display unit 110.

Content being displayed through the operated application may vary depending upon the type of the operated application.

When the user selects a menu of the contents control interface 10, which is displayed on the display unit 110, or when the user presses a menu button of the contents control interface 10, the sensor unit 120 may sense such user motion, and, then, the control unit 130 may control the unique function of the corresponding application in accordance with the detected signal.

When the user changes a position of the menu bar or button included in the corresponding application within the display unit 110 and relocates the position of the menu bar or button to a specific position within the display unit 110, e.g., when the user relocates the position of the menu bar to one side (or side) of a display screen, the sensor unit 120 may deliver the respective detection (or sense) signal to the control unit 130. Thereafter, the control unit 130 may fix a display direction of the content being displayed through the corresponding application, or the control unit 130 may fix a brightness level of the display screen.

When the user changes the movement or direction of the smart device without relocating the content control interface 10 of the operated application, the sensor unit 120 may detect such change in the movement or direction of the smart device. Then, the control unit 130 may control the smart device so that the content being displayed on the display screen is fixed to be always displayed along an upright direction regardless of the holding angle (or direction) of the smart device.

However, according to the disclosed embodiment, when the user moves the contents control interface 10 of the application, so as to relocate the contents control interface 10 to a specific position, the sensor unit 120 may detect (or sense) a position touched by the user. Subsequently, based upon the signal detected by the sensor unit 120, the control unit 130 may control the smart device so that the display direction of the content, which is displayed on the display screen of the display unit 110, can be fixed, even if the movement or direction of the smart device is changed.

The control unit 130 may fix the display direction of the displayed content in accordance with the position of the contents control interface of the operated application, and the control unit 130 may also set up a screen lock function so that the display direction of the contents can be changed in accordance with the position of the relocated menu bar. More specifically, as shown in the example of FIG. 6, the control unit 130 may relatively fix the position of the menu bar and the display direction of the content and may display the menu bar and the content in accordance with the fixed settings.

Accordingly, the display direction of the content may be consistently maintained, even if the direction of the smart device is changed.

In another example, when the sensor unit 120 detects a signal inputted by the user in order to relocate the menu bar of the application to a specific position, the control unit 130 may fix the brightness level of the display screen in accordance with the detected signal. Alternatively, when the sensor unit 120 detects a user's control signal for relocating the menu bar of the application, as shown in (d) of FIG. 9, the control unit 130 may control the smart device so that the brightness level of the display screen can be adjusted in accordance with the new position of the menu bar. More specifically, when the sensor unit 120 detects a movement distance between the initial position of the menu bar and the new position of the menu bar, the control unit 130 may adjust the brightness level of the display screen in accordance with the detected movement distance.

Although it is not shown in the drawing, the smart device according to the disclosed embodiment may include a storage unit, which is configured to store applications. The screen lock function or the brightness level adjusting function according to the disclosed embodiment may be performed by an application. In this case, the corresponding application may be stored in the storage unit. Thereafter, when the application is operated, the corresponding application may control the screen lock function or may control the brightness level of the display screen in accordance with the movement of the menu bar of the operated application through which the content is displayed.

For example, the application according to the disclosed embodiment may perform control operations enabling a program, which is configured as a plug-in, to be combined with a conventional application displaying contents, so that each application menu bar can control the screen lock function and the brightness level of the display screen.

Therefore, according to the disclosed embodiment, the display screen of the smart device may be easily controlled. And, when the user views a specific content through the smart device, the user may be capable of controlling screen setting without being interrupted from viewing the corresponding content.

It will be apparent to those skilled in the art that various modifications and variations can be made in the present disclosure without departing from the spirit or scope of the disclouser. Thus, it is intended that the present invention covers the modifications and variations of this disclosure, provided that they come within the scope of the appended claims and their equivalents.

What is claimed is:

1. A method for controlling a smart device, comprising:
    displaying contents on a display of the smart device;
    displaying a contents control interface controlling the contents;
    controlling a playback function of the contents in accordance with a first input inputted with respect to the contents control interface; and
    displaying the contents by automatically or manually rotating a display direction of the displayed contents,
    wherein the display direction of the contents is changed in accordance with a second input, the second input relocating a position of the contents control interface from a first side to a second side of the display.

2. The method of claim 1, further comprising:
    having the contents control interface disappear from a display screen after a predetermined period of time.

3. The method of claim 2, further comprising:
    detecting a rotating movement of the smart device; and
    when the smart device is operated in a manual mode, displaying the contents control interface on the display.

4. The method of claim 1, wherein a display direction of the contents is automatically rotated in accordance with a response of a direction of the smart device with respect to gravity.

5. The method of claim 1, wherein the contents are rotated after the relocation of the contents control interface is completed.

6. The method of claim 1, wherein, when the contents control interface contacts a docking part being displayed on a screen of the smart device and is docked to the docking part, a display direction of the contents is fixed.

7. The method of claim 6, wherein the docking part is located on a lowermost portion of the screen, and
    wherein the contents control interface comes in touch with the docking part in accordance with a third input, so as to fix the display direction of the contents, the third input relocating the contents control interface.

8. The method of claim 1, wherein a flicking function of the contents is fixed in accordance with the second input.

9. The method of claim 1, wherein the position of the contents control interface and the display direction of the contents are relatively fixed in accordance with the second input.

10. A method of controlling a smart device, comprising:
    displaying contents on a display of the smart device;
    displaying a contents control interface controlling the contents;
    controlling a function of the contents in accordance with a first input inputted with respect to the contents control interface; and
    displaying the contents by controlling a display brightness level of the contents,
    wherein the display brightness level of the contents is changed in accordance with a second input, the second input relocating a position of the contents control interface within the display.

11. The method of claim 10, further comprising:
    controlling the display brightness level by moving the position of the contents control interface from one side of the display.

12. A smart device, comprising:
    a display unit configured to display contents and to display a contents control interface controlling the contents;
    a sensor unit configured to detect a first input respective to the contents control interface and a second input relocating a position of the contents control interface from a first side to a second side of the display; and
    a control unit configured to control a function of the contents in accordance with the first input and changing a display direction of the contents in accordance with the second input.

* * * * *